United States Patent
Dai et al.

(10) Patent No.: US 9,403,305 B2
(45) Date of Patent: Aug. 2, 2016

(54) DEVICE TO APPLY COATINGS

(71) Applicant: HON HAI PRECISION INDUSTRY CO., LTD., New Taipei (TW)

(72) Inventors: Feng-Yuen Dai, New Taipei (TW); Jih-Chen Liu, New Taipei (TW); Hung-Lien Yeh, New Taipei (TW); Han-Lung Lee, New Taipei (TW); Shun-Chi Tseng, New Taipei (TW); Hung-Chun Ma, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/692,921

(22) Filed: Apr. 22, 2015

(65) Prior Publication Data

US 2015/0306798 A1 Oct. 29, 2015

(30) Foreign Application Priority Data

Apr. 23, 2014 (TW) .................................. 103114603

(51) Int. Cl.
*B29C 45/14* (2006.01)
*B29C 45/27* (2006.01)
*B29L 9/00* (2006.01)
*B29C 35/08* (2006.01)

(52) U.S. Cl.
CPC ..... *B29C 45/14336* (2013.01); *B29C 45/14065* (2013.01); *B29C 35/0888* (2013.01); *B29C 45/2708* (2013.01); *B29C 2035/0827* (2013.01); *B29C 2045/14098* (2013.01); *B29C 2045/2714* (2013.01); *B29L 2009/005* (2013.01)

(58) Field of Classification Search
CPC .................. B29C 45/14336; B29C 45/14032; B29C 2045/14049; B29C 45/27; B29C 45/14008; B29C 45/14065; B29C 2045/14098
See application file for complete search history.

(56) References Cited

U.S. PATENT DOCUMENTS

| | | | | |
|---|---|---|---|---|
| 3,759,644 A | * | 9/1973 | Ladney, Jr. | B29C 44/12 249/6 |
| 5,494,615 A | * | 2/1996 | Wang Lee | B29D 12/02 264/1.7 |
| 5,639,403 A | * | 6/1997 | Ida | B29C 45/14065 264/255 |
| 2009/0026677 A1 | * | 1/2009 | Liu | B29C 45/14065 269/21 |

* cited by examiner

*Primary Examiner* — Robert B Davis
(74) *Attorney, Agent, or Firm* — ScienBiziP, P.C.

(57) ABSTRACT

A device for applying a coating on a component where the component includes an inner surface, an outer surface, and end surfaces. The coating device includes a supporting pedestal, a UV light-transparent cover plate, a first pumping device, and an injecting device. The supporting pedestal is configured for holding the inner surface of the component, the end surfaces and the outer surface are exposed in the forming cavity. A through hole is defined in the center of the pedestal and a forming cavity is defined between the cover plate and the component when the cover plate is placed and secured on the pedestal. The first pumping device applies suction to the through hole to hold the component on the pedestal and the injecting device injects UV light-curable coating material in liquid form into the forming cavity.

12 Claims, 7 Drawing Sheets

DEVICE TO APPLY COATINGS

FIELD

The subject matter herein generally relates to a coating system for forming films on a component.

BACKGROUND

A protective film is usually required on a component used in consumer electronics.

BRIEF DESCRIPTION OF THE DRAWINGS

Implementations of the present technology will now be described, by way of example only, with reference to the attached figures.

DETAILED DESCRIPTION

Figure 1:
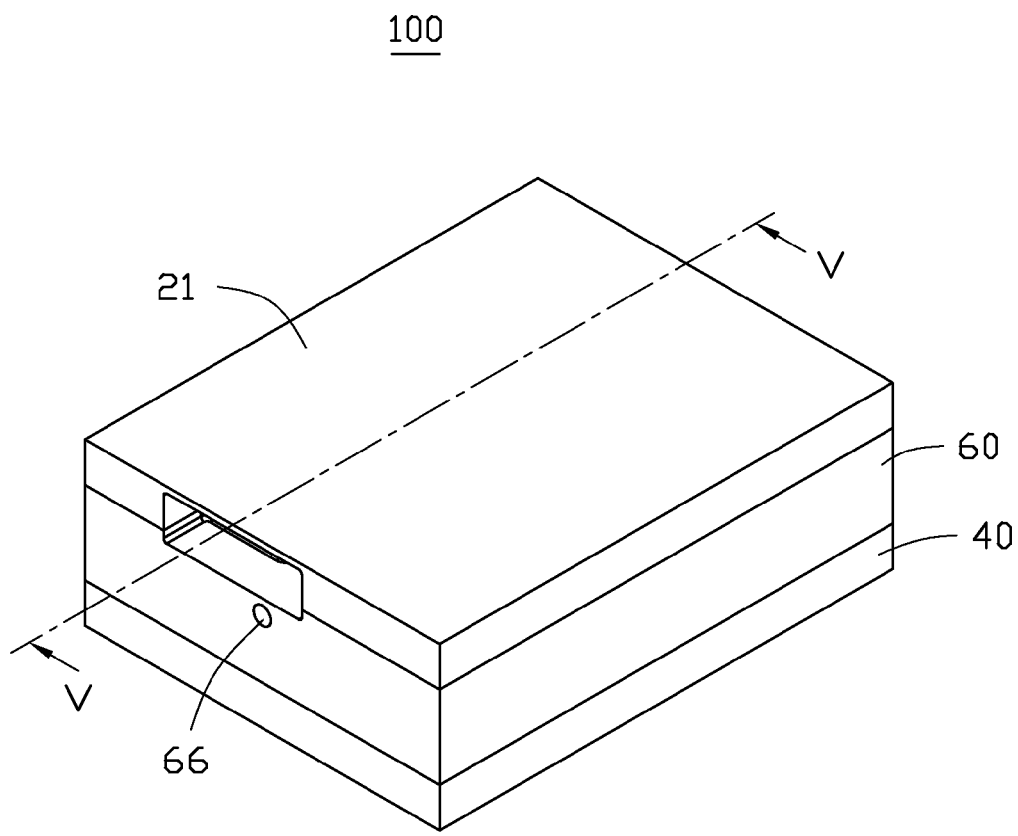
FIG. 1 is an isometric view of a coating device which includes a cover plate, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references "a plurality of" and "a number of" mean "at least two."

Figure 4:
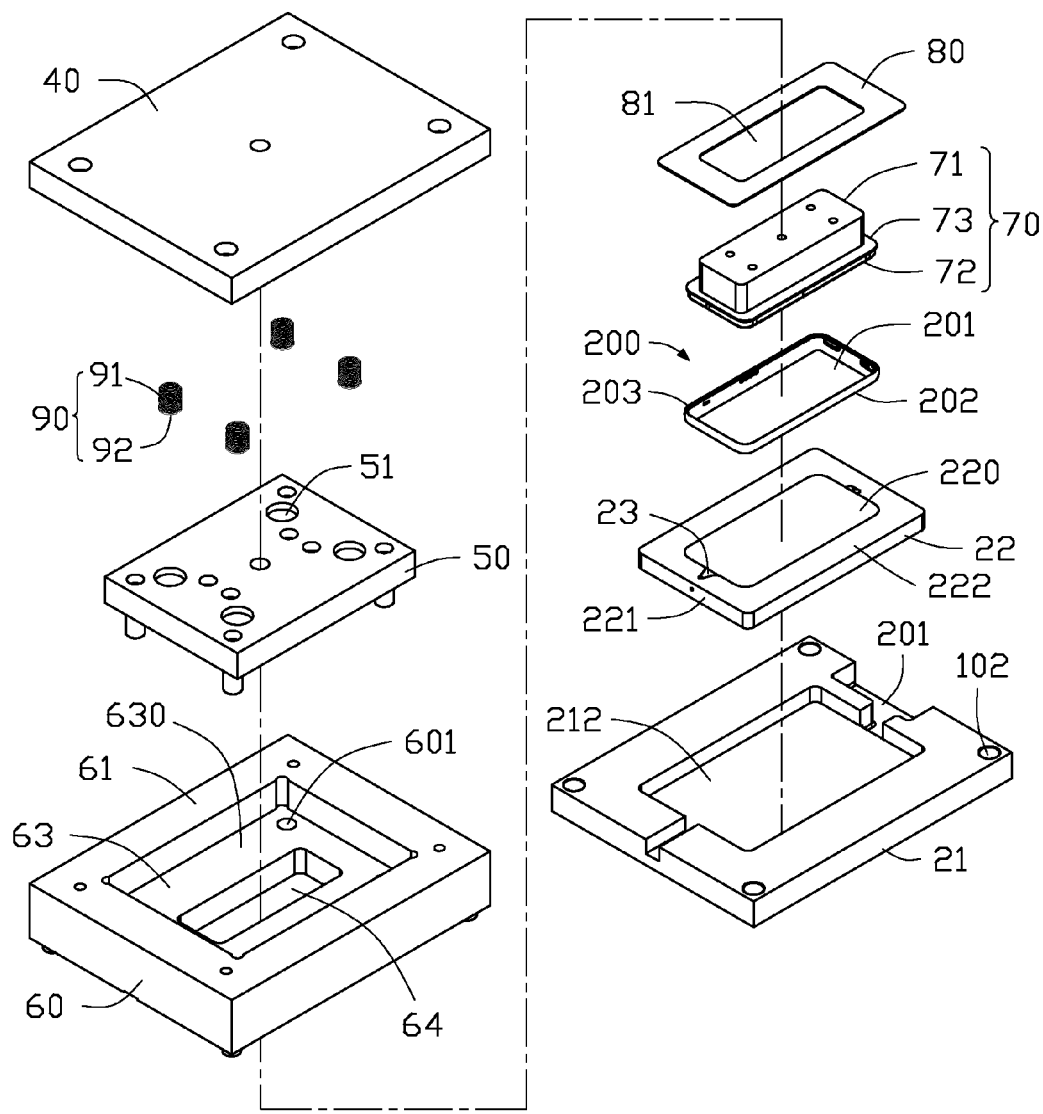
FIG. 4 is similar to FIG. 3, but viewed from another angle.

FIG. 1 shows a coating device 100 for forming films on a component 200 (shown in FIG. 4). The component 200 can be a housing for a consumer electronics device. The to-be-coated component 200 includes an outer surface 202, an inner surface 201 and an end surface 203 connecting the inner surface 201 and the outer surface 202. The coating device 100 is configured for forming films on the outer surface 202 and on the end surface 203.

The coating device 100 includes a supporting pedestal 10, a cover plate 20 matching the supporting pedestal 10, an injecting device 30, at least one pumping device and a curing device 45. In this embodiment, the at least one pumping device includes a first pumping device 351 and a second pumping device 352.

The supporting pedestal 10 is configured for holding the to-be-coated component 200. The cover plate 20 covers the to-be-coated component 200, and defines a forming cavity 205 between the cover plate 20 and the to-be-coated component 200. A thickness of the forming cavity 205 determines a thickness of the deposited film.

The supporting pedestal 10 includes a lower plate 40, an upper plate 60, a spacing plate 50 arranged between the lower plate 40 and the upper plate 60, a first adsorption member 70, a second adsorption member 80, and an elastic member 90. The supporting pedestal 10 also defines a through hole 101 in the centre thereof. In this embodiment, the through hole 101 runs through respective centers of the lower plate 40, the spacing plate 50, and the adsorption member 70.

The lower plate 40 is substantially cuboid and includes a number of first positioning holes 41. In this embodiment, there are four first positioning holes 41.

The spacing plate 50 is arranged on the lower plate 40 and is also substantially cuboid. The spacing plate 50 includes a number of first position posts 501 at four corners of a surface of the spacing plate 50, and defines a number of second positioning holes 51. The first position posts 501 and the second positioning holes 51 are formed on opposite surfaces of the spacing plate 50. The first positioning hole 41 and the second positioning hole 51 cooperatively hold the elastic member 90 (shown in FIG. 3 and FIG. 4). In this embodiment, the elastic member 90 includes a spring 91 and a press plate 92 connected to one end of the spring 91, the elastic member 90 is used for separating the spacing plate 50 from the lower plate 40.

Figure 2:
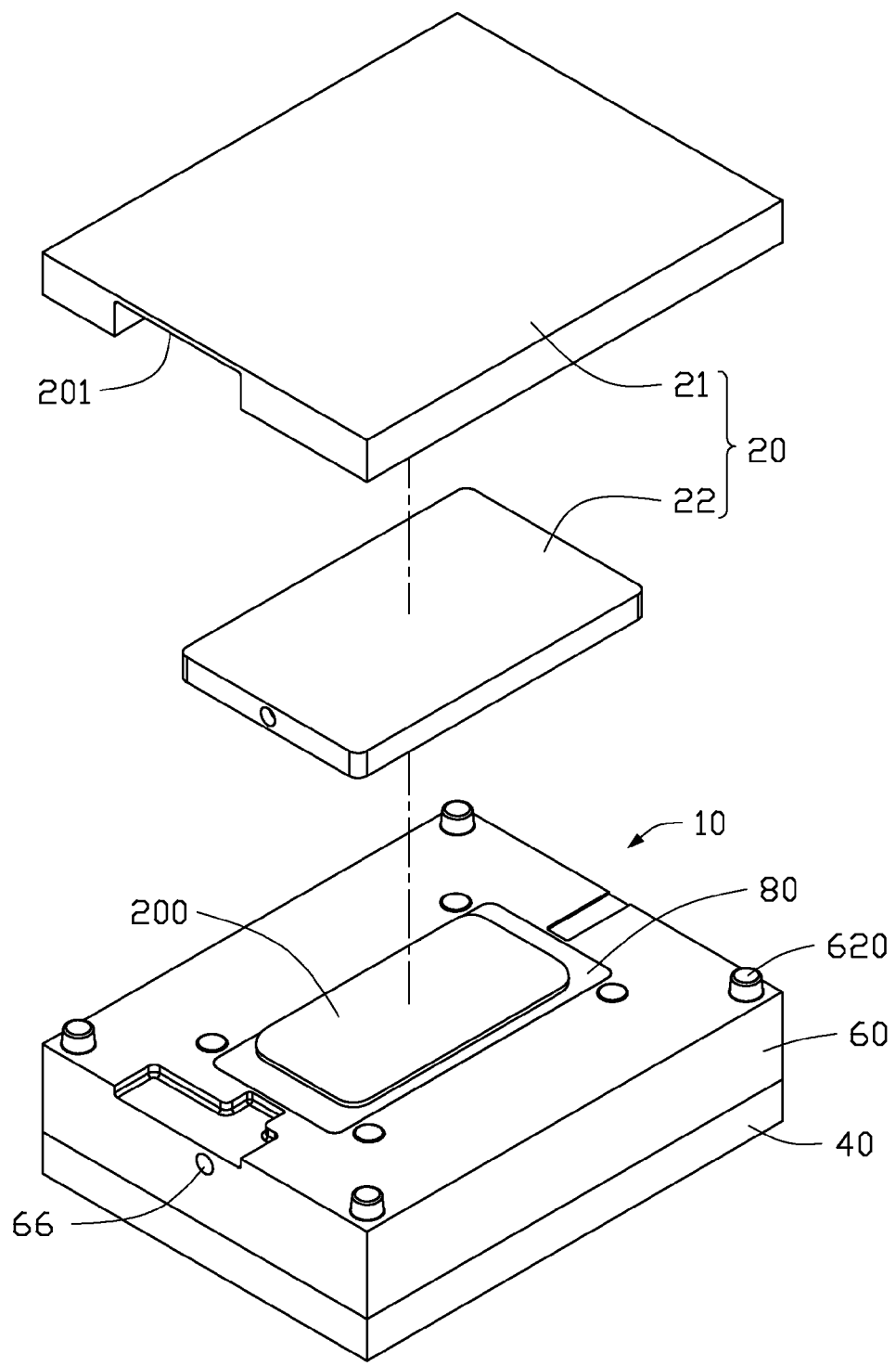
FIG. 2 is an exploded isometric view of the coating device of FIG. 1 with the cover plate removed.

The upper plate 60 is arranged on the lower plate 40 and includes a first surface 61, a second surface 62 opposite to the first surface 61, and a side surface 602 perpendicularly connecting the first surface 61 and the second surface 62, as shown in FIG. 2. In this embodiment, the first surface 61 is in contact with the lower plate 41. The first surface 61 defines a first receiving portion 63 in the center thereof. The first receiving portion 63 defines a bottom surface 630, the bottom surface 630 defines a number of third positioning holes 601 at each corner. The spacing plate 50 is arranged in the first receiving portion 63, and each positioning post 501 is inserted in one of the third positioning holes 601.

Figure 3:
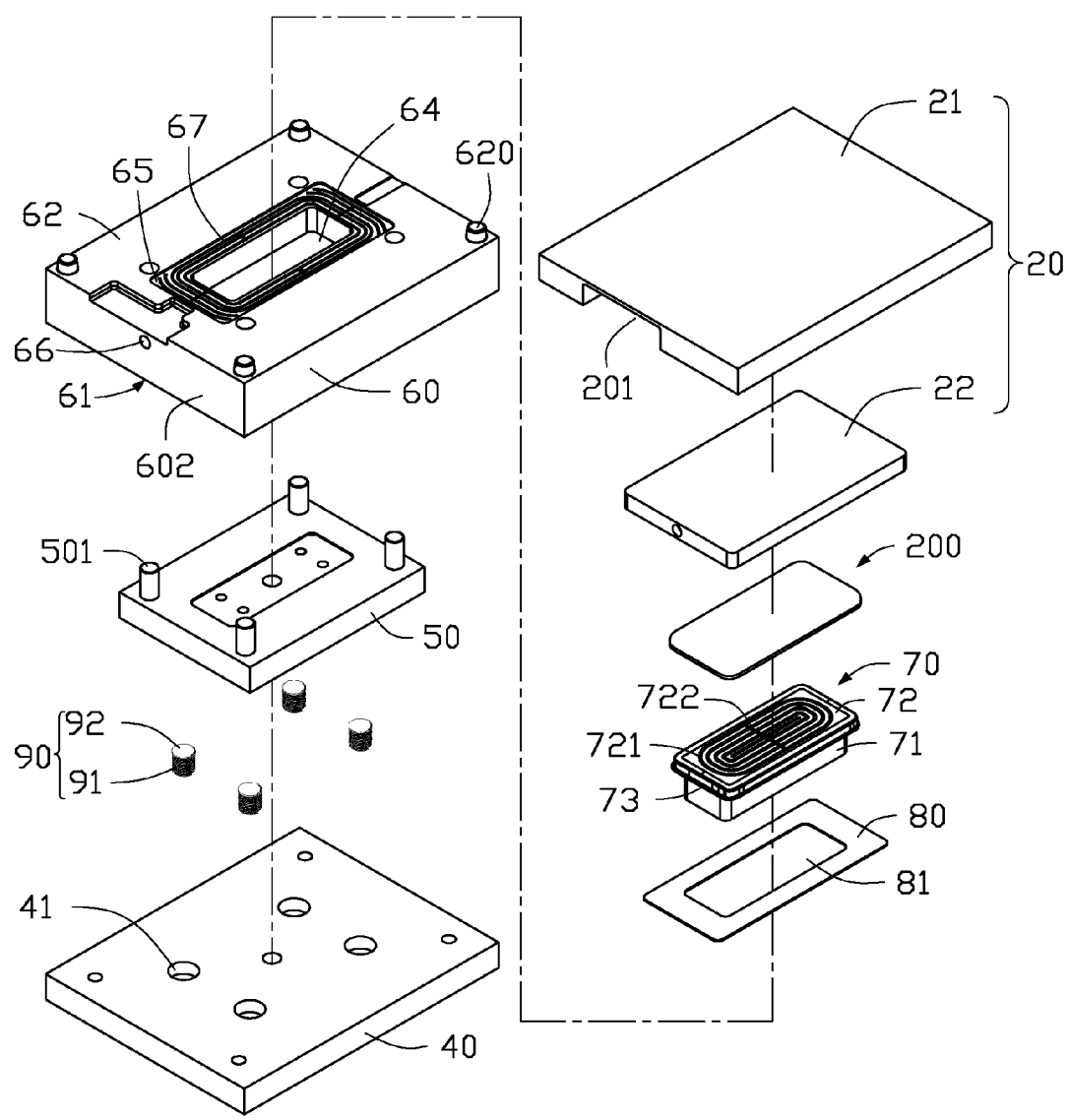
FIG. 3 is an exploded isometric view of the coating device of FIG. 1.

The second surface 62 defines a second receiving portion 64 and a recess 65 in the center thereof, as shown in FIG. 3. The second receiving portion 64 is opposite to and communicates with the first receiving portion 63. The recess 65 surrounds the second receiving portion 64. A depth of the recess 65 is less than a depth of the second receiving portion 64. The second receiving portion 64 is configured for receiving the first adsorption member 70. The recess 65 is configured for mounting the second adsorption member 80. A number of first ring channels 67 are arranged at a space between the recess 65 and the second receiving portion 64. The second surface 62 of the upper plate 60 further includes four first guide posts 620 at each corner.

The upper plate 60 further includes an air exhaust passage 66. The air exhaust passage 66 is substantially L-shaped and includes a first end 660 and a second end 661, the first end 660 passes through the side surface 602 and the second end 661 opens out into the recess 65. In this embodiment, the second end 661 communicates with one of the first ring channels 67. The air exhaust passage 66 is connected with the pumping device 35, the pumping device 35 is configured for drawing air from the air exhaust passage 66.

Figure 5:
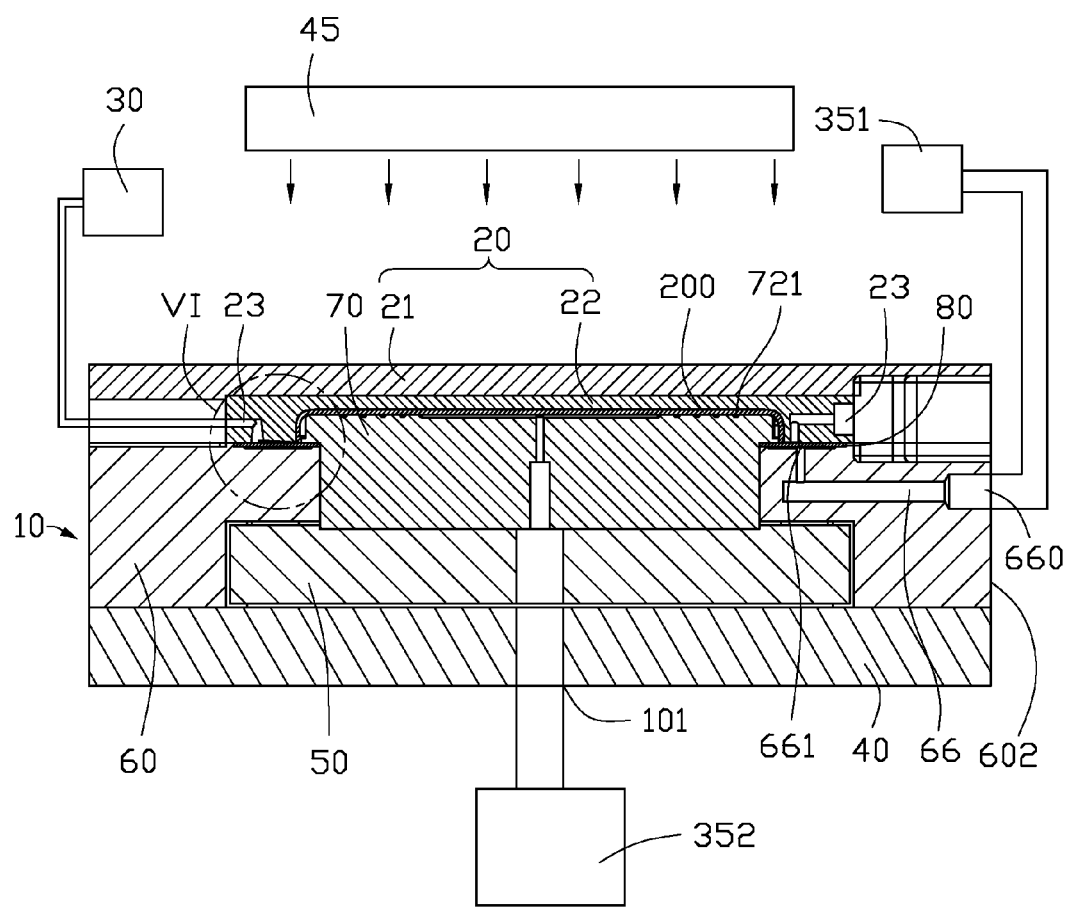
FIG. 5 is a cross sectional view of the coating device taken along line V-V of FIG. 1.

The first adsorption member 70 is substantially T-shaped, and includes a connection plate 71, a support member 72, and an extension portion 73. The extension portion 73 extends along periphery of the support member 72. The connection plate 71 is received in the second receiving portion 64. The support member 72 and the extension portion 73 are located outside of the second receiving portion 64, a surface of the extension portion 72 is in contact with the second adsorption member 80, as shown in FIG. 5.

The support member 72 includes a supporting surface 720, the supporting surface 720 defines a number of second ring channels 721 and a straight channel 722. The adsorption channels 721 have common center point, the straight channel 722 passes through the center point of the adsorption channels 721.

The second adsorption member 80 includes an opening 81, a size of the opening 81 is larger than that of the connection plate 71 and less than that of the extension portion 73. A material of the adsorption member 80 is silica gel, the adsorption member 80 promotes sealing of the forming cavity 205.

The cover plate 20 is substantially a cuboid made of transparent material and includes a first cover 21 and a second cover 22. The first cover 21 includes a first receiving space 212 facing toward the second cover 22 and the second cover 22 is received in the first receiving space 212. The second cover 22 includes a side surface 221, a bottom surface 222 perpendicularly connected with the side surface 221, and an injecting channel 23. The injecting channel 23 is L-shaped. The side surface 221 defines an injecting entrance of the injecting channel 23 and the bottom surface 222 defines an injecting exit of the injecting channel 23. The first cover 21 includes a cutout 201 and the cutout 201 exposes the injecting entrance of the injecting channel 23. The injecting exit is substantially wedge shaped and communicates with the forming cavity 205, the wedge shaped injecting exit helps the coating substance in liquid form (coating material 300) to flow into the forming cavity 205. In other embodiment, the first cover 21 and the second cover 22 can be formed in a mold. Preferably, the cover plate 20 is made from silicon material, a penetration rate of an ultra violet (UV) light with a wavelength of 350 to 420 nm passing through the silicon material can reach about 90%. The first cover 21 also includes four fourth positioning holes 102 at each corner, as shown in FIG. 4, each fourth positioning hole 102 matches each first guide post 620.

The injection device 30 is connected with the injected entrance 231 of the injecting channel 23, and is used for injecting coating material 300 into the forming cavity 205.

The curing device 45 is used to solidify the coating material 300 on the to-be-coated component 200 to form film. In this embodiment, the curing device 45 is an ultra violet (UV) light curing device.

Figure 6:
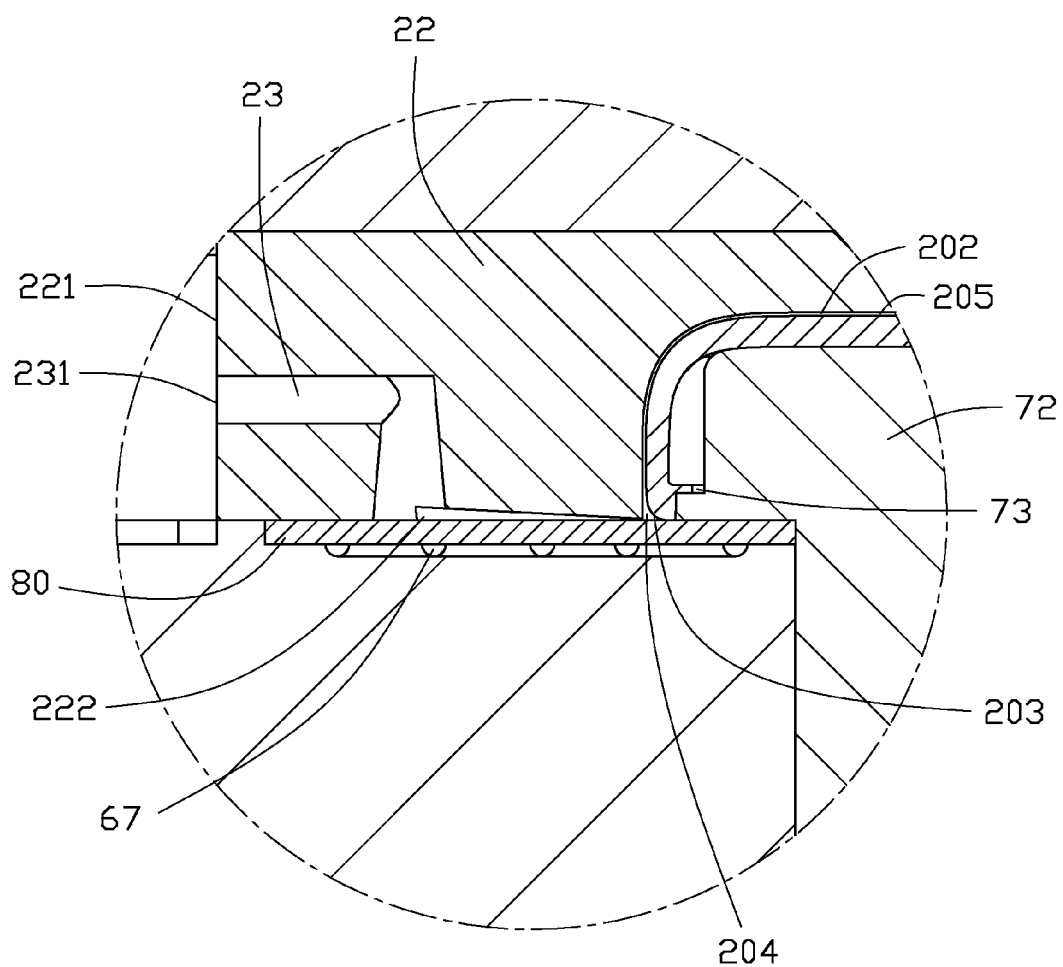
FIG. 6 is an enlarged view of circled portion VI of FIG. 5.
Figure 7:
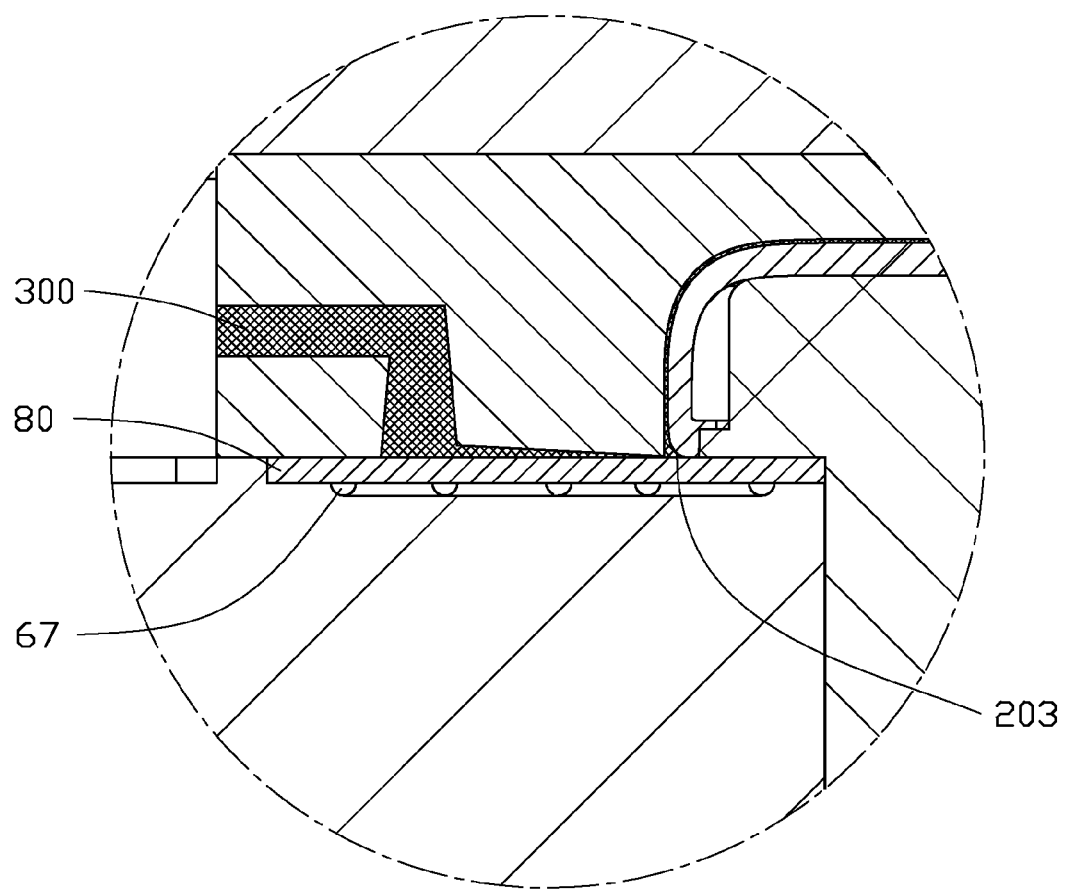
FIG. 7 is the coating device of FIG. 6 in use.

When the coating device 100 is used for forming film, the cover plate 20 is moved from the supporting pedestal 10, as shown in FIG. 5, and the to-be-coated component 200 is provided on the support member 72. A clearance gap (clearance 204, shown in FIG. 6) is formed between the end surface 203 and the second adsorption member 80, and then the cover plate 20 is disposed on the to-be-coated component 200. The cover plate 20 is fixed on the upper plate 60 through the fourth positioning holes 102 and the first positioning post 620, and the end surface 203 and the outer surface 202 are exposed in the forming cavity 205. The first pumping device 351 is connected with the air exhaust passage 66 and air is drawn from the forming cavity 205, to avoid bubbles in the coating material 300. The second pumping device 352 is connected with the through hole 101. Since the through hole 101 arrives at the inner surface 201 of the to-be-coated component 200, the first ring channels 67, the second ring channels 721, and the straight channel 722 are also helpful for providing a uniform and overall force to the component. The second pumping device 352 can draw air and thereby fix the to-be-coated component 200 on the supporting pedestal 10 firmly and evenly, this also will avoid the component 200 moving during a coating process. The injecting device 30 is connected with an injecting entrance of the injecting channel 23, and coating material 300 is injected into the forming cavity 205 through the injecting channel 23, and infills the forming cavity 205 and the clearance 204 between the end surface 203 and the second adsorption member 80. The coating material 300 uniformly fills the forming cavity 205 and forms film over the outer surface 202 and the inner surface 203, shown in FIG. 7. In the embodiment, the coating material 300 is first cured by an ultra violet (UV) light emitted from the curing device 45 passing through the cover plate 20 to form a solid coating on the outer surface 202, then the cover plate 20 is removed, and the coating material 300 on the end surface 203 is cured, thereby, the coating material 300 is solidified on the end surface 203.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A coating device for coating a film on a component, the to-be-coated component comprising an inner surface, an outer surface opposite to the inner surface and an end surface connecting the inner surface and the outer surface, the coating device comprising:

a supporting pedestal configured for holding a component to be coated; the supporting pedestal comprising a through hole in the center thereof;

a cover plate placing on the to-be-coated component and contact with the supporting pedestal, and defining a forming cavity between the cover plate and the component;

a first pumping device connected with the through hole, and configured to fix the to-be-coated component on the supporting pedestal;

an injecting device configured to inject a coating material into the forming cavity;

wherein the supporting pedestal is configured for holding the inner surface, the end surface and the outer surface are exposed in the forming cavity, the coating material is filled in the forming cavity and forms the film over the outer surface and the end surface; and wherein the supporting pedestal comprises a lower plate, an upper plate, a spacing plate, and a first adsorption member, the through hole runs through respective centers of the lower plate, the spacing plate and the adsorption member.

2. The coating device of claim 1, wherein the upper plate is arranged on the lower plate and comprises a first surface, a second surface opposite to the first surface, the first surface defines a first receiving portion in the center thereof, the spacing plate is arranged in the first receiving portion, the second surface defines a second receiving portion in the central thereof, the second receiving portion is configured for receiving the first adsorption member.

3. The coating device of claim 2, wherein the second surface further defines a recess, the recess surrounds the second receiving portion, a depth of the recess is less than a depth of the second receiving portion, the recess defines a plurality of first ring channels.

4. The coating device of claim 3, wherein the upper plate further comprises an air exhaust passage, the air exhaust passage is substantially L-shaped and includes a first end and a second end, the first end runs through the side surface, the second end opens out into the recess.

5. The coating device of claim 4, wherein the first adsorption member is substantially T-shaped, and comprises a connection plate, a support member and an extension portion, the extension portion is extended away along periphery of the support member, the connection plate is received in the second receiving portion, the support member and the extension portion are exposed outside of the second receiving portion.

6. The coating device of claim 5, further comprising a second adsorption member arranging in the recess, the second adsorption member comprises an opening, a size of the opening is larger than the connection plate and less than the extension portion, the connection plate passes through the opening, and the second adsorption member is arranged between the extension portion and the recess.

7. The coating device of claim 6, further comprising a elastic member, the elastic member comprising a spring and a press plate connected at one end of the spring, the elastic member is arranged between the lower plate and the spacing plate and used for separating the spacing plate from the lower plate.

8. The coating device of claim 7, wherein the cover plate is substantially a cuboid made of transparent material.

9. The coating device of claim 8, wherein the cover plate comprises a first cover and a second cover, the first cover comprises a first receiving space facing toward the second cover, the second cover is received in the first receiving space.

10. The coating device of claim 9, wherein the second cover comprises a side surface, a bottom surface which perpendicularly connected with the side surface and an injecting channel, the first cover exposes the injecting channel, the injecting channel is L-shaped, the side surface defines an injecting entrance of the injecting channel, the bottom surface defines the injecting exit, the injecting exit is substantially wedge shaped and communicates with the forming cavity.

11. The coating device of claim 10, further comprising a curing device, the curing device is used to solidifying the coating material on the component to form film.

12. A device for coating a surface of a component, the component having an inner surface defining a recess space and an outer surface opposite the inner surface, the coating device comprising:
 a supporting pedestal for holding the to-be-coated component;
 a cover plate positionable over the to-be-coated component when the to-be-coated component is held on the supporting pedestal;
 a first pumping device; and
 an injecting device;
  wherein, the supporting pedestal includes a defined channel connected to the first pumping device and the to-be-coated component is positioned on the supporting pedestal with the inner surface of the to-be-coated component covering the defined channel and activation of the first pumping device assists in holding the to-be-coated component on the supporting pedestal; and
  wherein, when the cover plate is positioned over the to-be-coated component, an injection cavity is defined between the outer surface of the to-be-coated component and the cover plate and the injecting device is configured to inject coating material into the injection cavity; and
 wherein the supporting pedestal comprises a lower plate, an upper plate, a spacing plate, a first adsorption member and a through hole, the through hole runs through respective centers of the lower plate, the spacing plate and the adsorption member.

* * * * *